J. J. Tucker,
Transplanter.
No. 93,250. Patented Aug. 3, 1869.

Witnesses
Inventor
J. J. Tucker

United States Patent Office.

J. J. TUCKER, OF ALBIA, IOWA.

Letters Patent No. 93,250, dated August 3, 1869.

---

IMPROVEMENT IN HEDGE-PLANTERS.

---

The Schedule referred to in these Letters Patent and making part of the same.

---

To all whom it may concern:

Be it known that I, J. J. TUCKER, of Albia, in the county of Monroe, and in the State of Iowa, have invented a new and useful Improvement in Hedge-Planters; and do hereby declare that the following is a full, clear, and exact description thereof, reference being had to the accompanying drawing, making a part of this specification, in which—

Letters of like name and kind refer to like parts in each of the figures.

Figure 1:
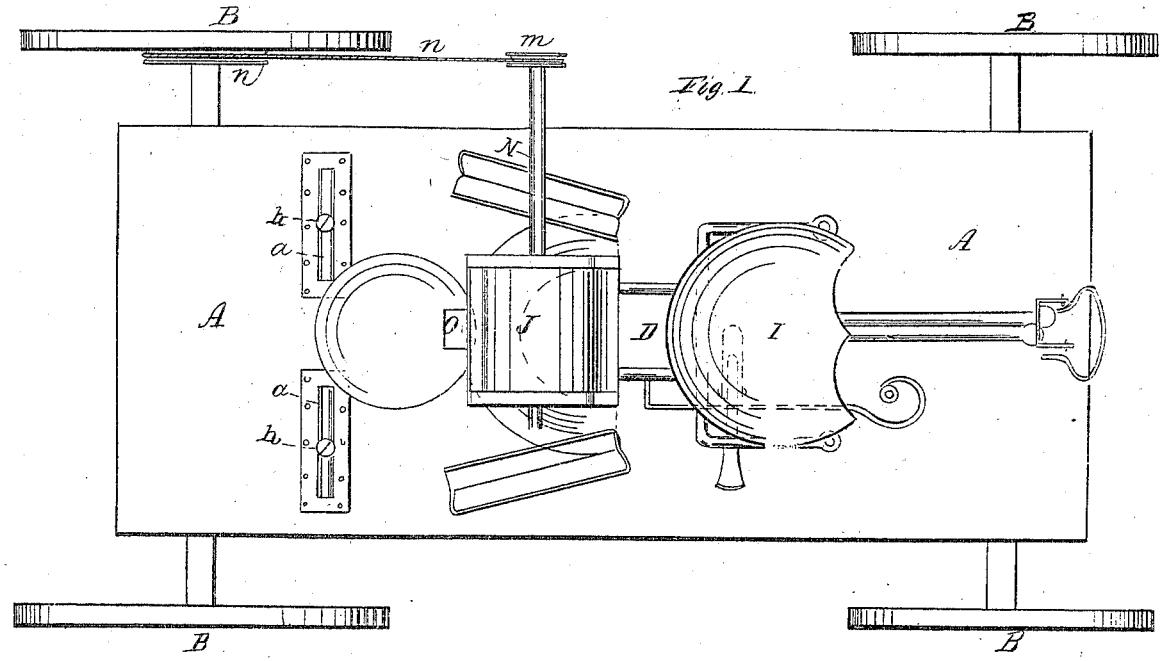
Figure 1 is a plan view of the upper side of my improved machine.
Figure 2:
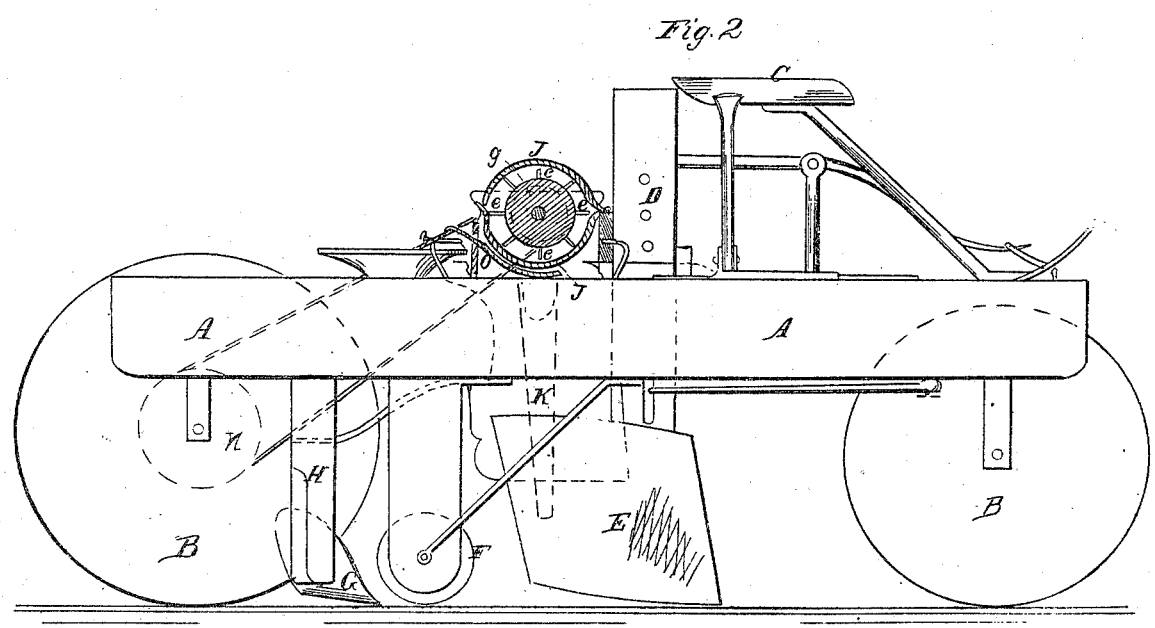
Figure 2 is a side elevation of the same.

My invention is an improvement upon a device for planting hedges, for which Letters Patent, No. 98,703, were granted me on the 1st day of June, 1869; and It consists in the addition thereto of a suitable hopper and funnel for containing and conducting seed to the ground, and of the devices by means of which said seed is caused to flow evenly through said funnel, and by which the quantity thus passing out of the hopper is regulated.

As in my first machine, I employ a bed or body, A, mounted upon suitable wheels, B B, for the support of my planting-devices.

Immediately in rear of the driver's seat C, is an opening in the bed A, through which passes a vertical standard, D, having upon its lower end a wedge-shaped plow, E, alike upon either side.

Said standard is made adjustable vertically by suitable means, so as to enable the depth of the furrow to be regulated.

Immediately in rear of the plow, two rollers, F F, are pivoted upon the lower end of suitable standards, with their axis at a right angle to the line of motion.

Said rollers are tapered from their outer to their inner ends, so as to press down the earth, thrown up by the plow, in the form of a ridge, or highest at the centre.

In rear of the rollers F F, are two covering-shovels or plows, G G, secured to the lower ends of the standards H H, the upper ends of which are tenoned in mortises, a a, extending laterally across the body.

A screw, h, passes through each mortise into a standard, and holds it firmly in place when adjusted laterally to the desired position.

To the hereinbefore-described devices, which are common to my patented machine, in which cuttings are planted, I add those for sowing the seed, consisting of a cylindrical hopper, I, provided with a funnel or spout, K, which is secured to the body immediately in rear of the plow-standard D.

Said cylindrical hopper is placed horizontally and at a right angle to the line of draught, and contains a cylinder, L, which is secured to and revolves with a shaft, M, suitably journalled within the vertical ends of said hopper.

The cylinder L is considerably less in diameter than the hopper, and has projecting radially from its periphery a series of pins, l l, which, when seed is supplied to said hopper, and said cylinder caused to revolve, thoroughly agitates said seed, and causes it to flow through the spout in an even stream.

Motion is imparted to the cylinder by means of a pulley, N, secured to the inner face of one of the rear ground wheels, and connected, by means of a cord or belt, n, with another pulley, m, secured to the outer end of the shaft M.

In order that the quantity of seed discharged from the hopper may be regulated at will, a slide, O, consisting of a strip of sheet-metal, in width nearly equalling the diameter of the upper end of the funnel, passes through a horizontal slot in one side of the latter, and when pressed in closes the opening through the same.

The size of said opening may be varied at will by withdrawing the slide or returning the same.

When it is desired to plant shoots, the hopper and other seed-devices can be removed, leaving the machine as before, For convenience, the upper portion of the hopper is hinged so as to enable it to be opened.

The operation of this device will be readily understood.

Seed being supplied to the hopper, the furrow and covering-plows adjusted, and the machine drawn forward, a furrow is formed into which seed is dropped from the hopper through the funnel.

The rollers following after, press the earth into the furrow, covering the seed, and leaving a ridge, highest at the centre, upon which the covering-shovels throw an additional quantity of earth, and complete the operation.

It is believed that this machine is the only device for planting, rolling, and covering hedge-seed which has ever been constructed, and that its desirableness and convenience will insure its general adoption in sections of country where hedges are used as substitutes for fences.

Having thus fully set forth the nature and merits of my invention,

What I claim as new, and desire to secure by Letters Patent, is—

The within-described devices for sowing hedge-seed, consisting of the hopper I, funnel K, cylinder L, provided with the pins l l, shaft M, pulleys N and m, and slide O, in combination with the body A, wheels B B, standard D, plow E, rollers F F, and covering-shovels G G, all constructed and arranged to operate substantially as and for the purpose specified.

In testimony that I claim the foregoing, I have hereunto set my hand, this 11th day of June, 1869.

J. J. TUCKER.

Witnesses:
B. F. YOCUM
C. L. NELSON.